United States Patent [19]

Naruse et al.

[11] Patent Number: 4,800,398

[45] Date of Patent: Jan. 24, 1989

[54] INK-JET PRINTER WITH AN ENCASED PRINTER HEAD UNIT

[75] Inventors: Osamu Naruse; Chuji Ishikawa, both of Yokohama; Sadao Kakeno; Kyuhachiro Iwasaki, both of Fujisawa, all of Japan

[73] Assignee: Ricoh Company, Ltd., Tokyo, Japan

[21] Appl. No.: 120,634

[22] Filed: Nov. 13, 1987

[30] Foreign Application Priority Data

Nov. 14, 1986 [JP] Japan ................................ 61-271509

[51] Int. Cl.$^4$ ................................ G01D 15/18

[52] U.S. Cl. ................................ 346/75; 346/140 R

[58] Field of Search ................................ 346/75, 140 R

[56] References Cited

U.S. PATENT DOCUMENTS 4,369,450 1/1983 Iwagami et al. ....................... 346/75

4,617,574 10/1986 Millet et al. ........................... 346/75

*Primary Examiner*—E. A. Goldberg

*Assistant Examiner*—Gerald E. Preston

*Attorney, Agent, or Firm*—Cooper & Dunham

[57] ABSTRACT

An ink-jet printer includes an ink-jet head assembly which has a modular structure. The head assembly includes a generally bathtub-shaped bottom case in which an ink head for ejecting a series of charged ink droplets is mounted and a pair of top and bottom deflection electrodes is also mounted. The head assembly also includes a similarly bathtub-shaped top case which is mounted on the bottom case upside down to define a substantially enclosed space therebetween. The ink head is supported so as to be adjustable in orientation. And, one end of the ink head is supported as a pivotal point so that the other free end may be oriented in any desired direction. In another structure, a print head assembly is detachably mounted on a carriage and the print head assembly includes an inner ink mist absorbing member formed with a slit and formed from a metal. A carriage cover is detachably mounted on the carriage to cover the print head assembly set in position. The carriage cover is provided with an outer ink mist absorbing member formed with a slit and formed from a resin material.

16 Claims, 9 Drawing Sheets

INK-JET PRINTER WITH AN ENCASED PRINTER HEAD UNIT

BACKGROUND OF THE INVENTION

1. Field of the Invention

This invention generally relates to an ink-jet printer, and, in particular, to an encased ink-jet printer head unit having a substantially enclosed structure. More specifically, the present invention relates to an encased print head unit suitable for use in an ink-jet printer of the type in which a series of charged ink droplets are passed through an electric field which is modulated by an image to be recorded.

2. Description of the Prior Art

An ink-jet printer is well-known in the art and one example of a prior art ink-jet printer is shown schematically in FIG. 5. The ink-jet printer shown in FIG. 5 is the so-called charged ink droplet deflection type ink-jet printer in which a series of charged ink droplets are passed through an electric field whose strength is modulated by an image to be recorded to thereby cause the charged ink droplets to be deflected selectively in accordance with image information to be recorded. As shown in FIG. 5, the charged ink droplet deflection type ink-jet printer includes a carriage 1, and a print head 4, from which a series of ink droplet are ejected, is mounted on the carriage 1 via a pair of first and second adjusting plates 2 and 3. A pair of top and bottom deflection electrodes 5 and 6 spaced apart from each other vertically is disposed in front of the print head 4. A gutter 1*a* for collecting non-deflected ink droplets is integrally formed with the carriage 1. The first adjusting plate 2 is mounted on a horizontal section 1*b* of the carriage 1 such that it can be adjusted in angular orientation on the horizontal section 1*b* of the carriage by means of an off-center screw 7. On the other hand, the second adjusting plate 3 is generally L-shaped and pivotally supported by a pair of horizontal pins 8 and it is normally spring-biased to have a tendency to rotate around the pins 8 in the clockwise direction. An adjusting screw 9 extends through a hole formed in the second adjusting plate 3 and determines the angular position of the second adjusting plate 3 around the pins 8. With this structure, the ink droplet ejecting direction by the head 4 may be adjusted not only in the horizontal direction but also in the vertical direction.

In operation, a series of ink droplets are ejected from the head 4 forwardly and they fly through the gap between the top and bottom deflection electrodes 5 and 6, between which an electric field may be formed. Although not shown in FIG. 5, a charging ring is normally disposed at or near the exit of the head 4 so that a series of ink droplets ejected from the head 4 are charged to a predetermined level. If no image information is supplied, the charged ink droplets fly along the gap between the top and bottom deflection electrodes 5 and 6 to be collected into the gutter 1*a*. In this instance, an electric field may be present between the top and bottom electrodes 5 and 6, but the electric field strength is weak enough to cause the ink droplets to be collected into the gutter 1*a*. On the other hand, when image information to be recorded is supplied, the strength of the electric field formed between the top and bottom electrodes 5 and 6 is modulated in accordance with the image information thus supplied, so that the charged ink droplets flying along the gap between the top and bottom electrodes 5 and 6 are deflected selectively, whereby the magnitude of deflection depends on the level of electric field intensity. The thus deflected ink droplets are not captured by the gutter 1*a*, but they fly past the gutter 1*a* to land on a sheet of recording paper placed opposite to the print head 4. In this manner, ink-jet recording can be carried out.

However, with the prior art ink-jet printer shown in FIG. 5, ink may fall onto the carriage 1 for some reason, for example, overflowing from the print head 4, and such spilled over ink may be scattered around, thereby causing various problems, such as smearing and shorting of printed circuit boards typically incorporated in such a printer, though not shown specifically. Besides, it was often the case that the print head 4 became disoriented after using for a while. In such a case, attendance of a skilled service personnel was required because the adjustments in orientation of the print head 4 was a delicate task so as to obtain a fine printing quality.

SUMMARY OF THE INVENTION

In accordance with the present invention, there is provided a print head assembly suitable for use in a charged ink droplet deflection type ink-jet printer, which comprises a generally bathtub-shaped bottom case in which an ink-jet print head is substantially disposed. Preferably, a similarly bathtub-shaped top case is mounted on the bottom case upside down to thereby define an closed space in which the print head is located. Preferably, a pair of top and bottom deflection electrodes is also located in the enclosed space, and, a gutter is preferably formed integrally with the bottom case. The print head is mounted on the bottom case adjustably in orientation. In one embodiment, the print head is mounted on the bottom case so as to be pivotally movable at one end horizontally as well as vertically, thereby allowing to adjust the orientation of the print head while being mounted on the bottom case.

In another embodiment, a first ink mist absorbing member is provided at the front end surface of the cover. The first ink mist absorbing member is preferably comprised of a metal, and a slit is typically formed in the first ink mist absorbing member so as to allow passage of ink droplets therethrough. A cover which covers the print head assembly when detachably mounted on a carriage is also preferably provided with a second ink mist absorbing member, which is preferably comprised of a resin material. The second ink mist absorbing member is also preferably formed with a slit which is aligned with the slit of the print head assembly when the print head assembly is mounted in position on the carriage.

It is therefore a primary object of the present invention to obviate the disadvantages of the prior art as described above and to provide an improved ink-jet printer.

Another object of the present invention is to provide an improved ink-jet printer of the charged ink droplet deflection type in which a series of ink droplets are charged and selectively deflected in accordance with image information to be recorded.

A further object of the present invention is to provide an improved print head assembly for use in an ink-jet printer, in particular, of the charged ink droplet deflection type.

A still further object of the present invention is to provide a modular type print head assembly for use in an ink-jet printer.

A still further object of the present invention is to provide an improved print head assembly easy to handle, well protected and high in performance.

Other objects, advantages and novel features of the present invention will become apparent from the following detailed description of the invention when considered in conjunction with the accompanying drawings.

DESCRIPTION OF THE PREFERRED EMBODIMENTS

Figure 1:
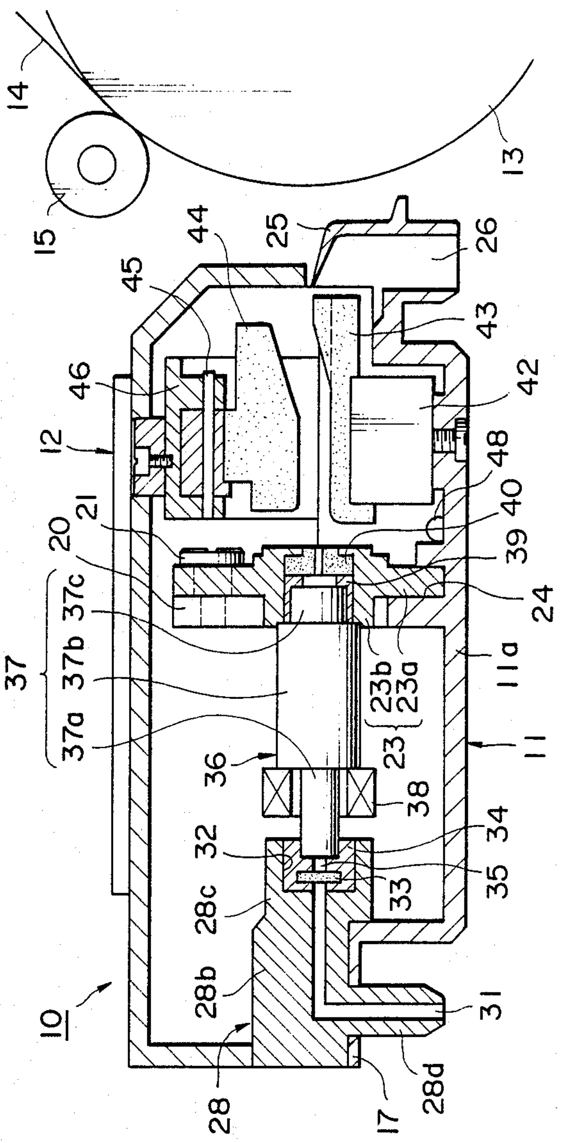
FIG. 1 is a schematic illustration showing generally in cross section an ink-jet print head assembly constructed in accordance with one embodiment of the present invention.

As shown in the drawings, in accordance with one aspect of the present invention, there is provided an ink head 36 from which a series of charged ink droplets are ejected toward a gutter 25. The ink droplets fly through the gap defined between a pair of top and bottom electrodes 44 and 43, in which an electric field is formed. Thus, the electric field is modified in accordance image information to be recorded, so that the ink droplets are selectively deflected, so that those ink droplets which have been sufficiently deflected fly over the gutter 25 to land on a sheet of recording paper 14 placed around a platen roller 13. In this manner, a desired image is recorded on the sheet of paper 14. A modular type print head assembly 10 of the present invention includes a generally bathtub-shaped bottom case or base 11 in which the ink head 36 is located. In the illustrated embodiment, the pair of top and bottom electrodes 44 and 43 is also mounted in the bottom case 11 and the gutter 25 is formed integrally with the bottom case 11 at its forward end. A top case 12 is also generally bathtub-shaped and it is mounted on the bottom case as being upside down to thereby define a substantially enclosed space between the top and bottom cases 12 and 11.

Figure 2:
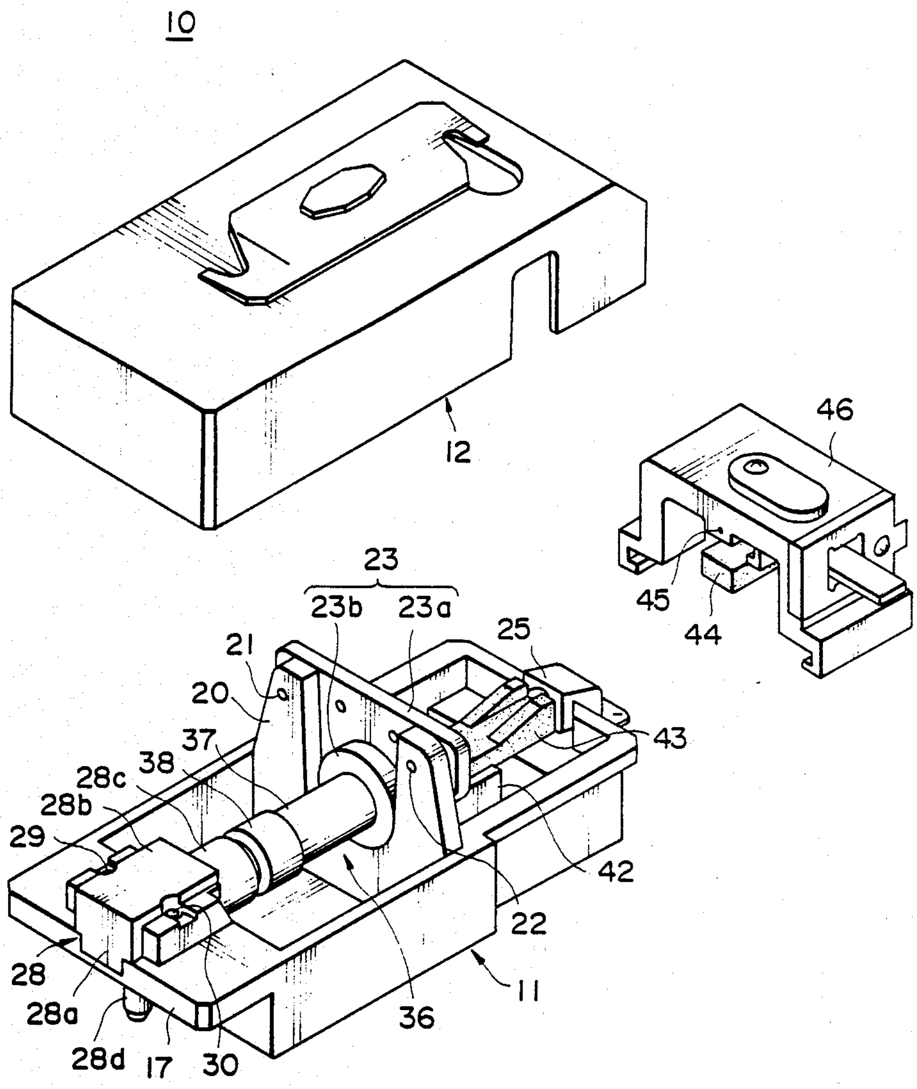
FIG. 2 is perspective, exploded view of the ink-jet print head assembly of FIG. 1.

Now, referring to FIGS. 1 and 2, there is shown schematically an ink-jet print head assembly 10 constructed in accordance with one embodiment of the present invention. As shown, the present print head assembly 10 is generally of a modular type and it includes a generally bathtub-shaped bottom case or base 11 and also a generally bathtub-shaped top case 12 which is mounted on the bottom case 11 upside down. As a result, a substantially enclosed space is defined between the top and bottom cases 12 and 11. The print head assembly 10 is typically detachably mounted on a carriage (not shown), which reciprocatingly moves in parallel with a platen roller 13 around which a sheet of recording paper 14 is set, for example, by a bail roller 15. As a result, as the present print head assembly 10 is moved along the platen roller 13 reciprocatingly, ink droplets are applied to the sheet of paper 14 from the present spring head 10 to thereby carry out recording.

Figure 3:
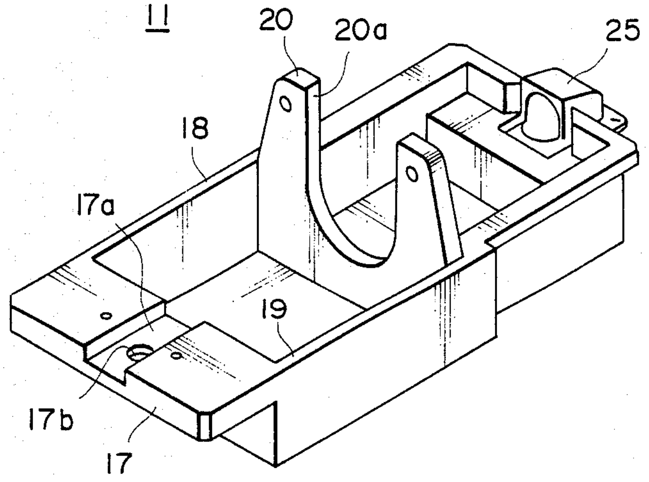
FIG. 3 is a perspective view showing a bathtub-shaped bottom case which constitutes a part of the assembly shown in FIGS. 1 and 2.

As best shown in FIG. 3, the bathtub-shaped bottom case 11 is provided with an outwardly extending horizontal section 17 at one end thereof, and the horizontal section 17 is formed with a mating groove **17*a* at the center of its top surface extending horizontally with a predetermined width. A hole 17*b* is formed in the horizontal section 17 as extending therethrough vertically. The bottom case 11 has a pair of side walls 18 and 19 and a head support 20 is provided generally at the center of the bottom case 11 as extending laterally between the side walls 18 and 19. The head support 20 is formed with a U-shaped cut-way portion 20*a* and a threaded hole is provided at the top of each of the two upstanding legs of the head support 20. As shown in FIGS. 1 and 2, screws 21 and 22 may be threaded into the respective threaded holes to fixedly attach a head holder 23 to the head support 20. The head holder 23 includes a generally rectangular plate portion 23*a* and a cylindrical portion 23*b*, which are integrally formed. When set in position, the bottom end of the plate portion 23*a* of the head holder 23 is fitted into a mating groove 24 formed at a bottom wall of the bottom case 11. In addition, at the front end (right-hand side in FIG. 1) of the bottom case 11 is integrally formed with a gutter 25. Although not shown, a pipe or tube may be fitted into a passage 26 of the gutter 25** so as to allow collected ink to be returned to an ink tank (not shown) for reuse.

As shown in FIGS. 1 and 2, an inlet joint member 28 is mounted on the horizontal section 17 of the bottom case 11. The inlet joint member 28 has a mating projection **28*a* which may be fitted into the mating groove 17*a* of the horizontal section 17, so that the inlet joint member 28 may be set in position properly. And, the inlet joint member 28 may be fixedly attached to the horizontal section 17 by means of screws 29 and 30. The inlet joint member 28 includes a main body portion 28*b*, a forwardly projecting columnar portion 28*c* which projects forwardly from the front end of the main body portion 28*b*. And, the mating projection 28*a* is formed at the bottom surface of the main body portion 28*b*. The inlet joint member 28 is also provided with a rod-shaped connecting projection 28*d* which extends downwardly from the center of the mating projection 28*a*. A fluid passage 31 is formed inside of the inlet joint member 28, a part of which extends along the connecting projection 28*d*. Thus, a pipe or tube may be fitted onto the connecting projection 28*d* to establish a fluid communication with an ink tank (not shown). The fluid passage also extends along the columnar portion 28*c* of the inlet joint member 28 and opens into a circular hole or counter bore 32 formed at the forward end of the columnar projecting portion 28*c***.

Inside of the hole 32 is disposed a final filter 33 as supported by a packing 34 which is fitted into the end hole 32. In the preferred embodiment, the packing 34 is provided with a grommet structure for supporting the final filter 33. The packing 34 is also formed with a through-hole 35 and the filter 35 is provided to block the through-hole 35, so that liquid must pass through the filter 35 when flows through the through-hole 35. The base end portion of the ink head 36 is fitted into the mouth portion of the through-hole 35, so that a passage formed inside a body portion 37 of the ink head 36 is in fluidic communication with the passage 31 of the inlet joint member 28 via the through-hole 35 of the packing 34.

The ink head 36 includes the head main body 37, a piezo oscillator 38, a nozzle plate 39, a charging electrode 40, and a heater (not shown). The head main body 37 is preferably comprised of ceramics, and, although not shown, a fluid passage is formed as extending therethrough longitudinally. The head main body 37 includes a small diameter section 37*a* at the base end, which is partly fitted into the through-hole 35 of the packing 34, a large diameter section 37*b* at the middle, and an intermediate diameter section 37*c* at the forward end. The piezo oscillator 38 is fixedly mounted around the outer peripheral surface of the small diameter section 37*a*, and a heater (not shown) is fixedly attached to the outer peripheral surface of the large diameter section 37*b* in a desired pattern. And, the nozzle plate 39 in the form of a cap having a hole at its top is fitted onto the intermediate diameter section 37*c*, and the charging electrode 40 is mounted on the nozzle plate 39 at its forward end. The cap-shaped nozzle plate 39 is generally cylindrical in shape and the charging electrode 40 is ring-shaped and provided with a through-hole at its center. When assembled, the passage of the head main body 37 is aligned with the holes of the nozzle plate 39 and of the charging electrode 40. Thus, a series of ink droplets ejected out of the head main body 37 as driven by a driving force applied by the piezo oscillator 38 may pass through the holes of the nozzle plate 39 and of the charging electrode 40. As a result, a series of charged ink droplets may be obtained from the ink head 36. The forward end of the ink end 36, defined by the intermediate diameter section 37*c*, nozzle plate 39 and charging electrode 40, is fitted into the cylindrical portion 23*b*. of the head holder 23, so that the forward end portion of the ink head 36 is supported by the head holder 23.

On the other hand, forwardly of the head support 20 integrally formed with the bottom case 11 is provided an electrode support block 42 which is fixedly attached to the bottom wall 11*a* of the bottom case 11 by means of a screw. And, the bottom deflection electrode 43, which is preferably maintained at the ground level during operation, is fixedly attached to the top surface of the support block 42. The top deflection electrode 44, which is preferably maintained at a high voltage level during operation, is disposed above the bottom electrode 43 as spaced apart over a predetermined distance vertically to thereby define an ink droplet flying gap therebetween. The top electrode 44 is supported by a bridge member 46 through a pin 45, and the bridge member 46 includes a horizontal wall section and a pair of side wall sections which depend from both ends of the horizontal wall section vertically downwardly. The bridge member 46 is set in position with the side wall sections abutting against the side walls of the bottom case 11. Thus, during operation, an electric field is formed between the pair of top and bottom electrodes 44 and 43, through which a series of charged ink droplets fly from the ink head 36 toward the gutter 25. The strength of the electric field is modulated by image information to be recorded, so that the series of charged ink droplets are selectively deflected to thereby cause the sufficiently deflected droplets to land on the sheet of paper 14.

An ink leakage detector 48 is also provided on the bottom wall 11*a* of the bottom case 11. Thus, if the ink droplets are ejected in wrong directions or the ink spills over from the ink head 36 to drop into the bottom case 11, the ink is prevented from flowing out of the bottom case 11 because of its particular shape and kept inside of the bottom case 11, so that the occurrence of such abnormal conditions may be easily detected by the leakage detector 48.

Figure 4:
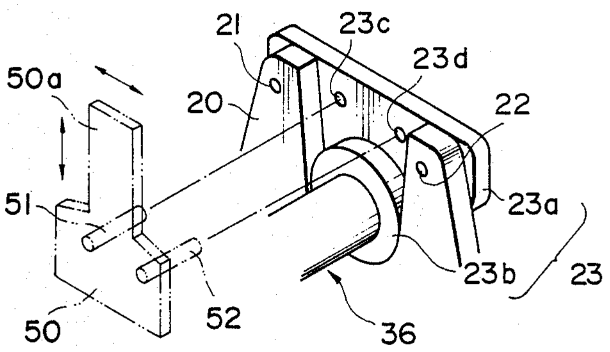
FIG. 4 is a schematic illustration showing how to adjust the orientation of the ink head so as to adjust the ink ejecting direction in the assembly shown in FIGS. 1 and 2.
Figure 5:
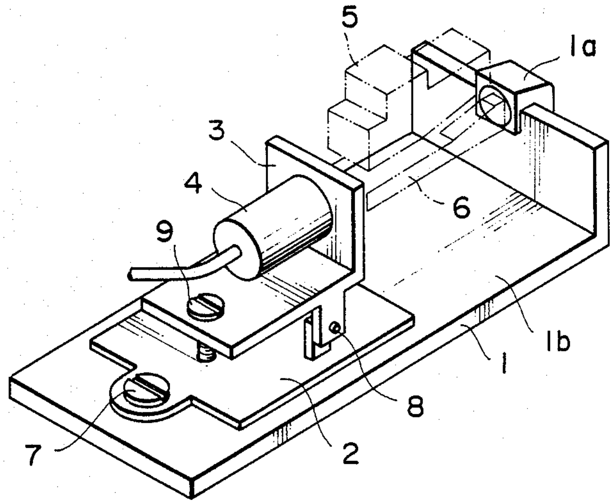
FIG. 5 PRIOR ART
FIG. 5 is a perspective, schematic illustration showing a typical prior art ink-jet printer of the charged ink droplet deflection type.

As best shown in FIG. 4, the plate portion 23*a* of the head holder 23 is provided with a pair of engaging holes 23*c* and 23*d* at its top. An orientation adjusting tool 50 is provided with a pair of engaging pins 51 and 52 which may be fitted into the corresponding engaging holes 23*c* and 23*d* of the head holder 23. Thus, when adjustments in orientation of the ink head 36 are required, an operator grabs a tab portion 50*a* of the adjusting tool 50 and set the adjusting tool 50 in engagement with the head holder 23 through engagement between the holes 23*c*, 23*d* and the pins 51, 52. Then, the operator may move the adjusting tool 50 horizontally and vertically as indicated by the double-headed arrows in FIG. 4 as required. As a result, the ink head 36 moves pivotally with its base end fitted into and received by the packing 34 as a pivotal point, so that the forward end of the ink head 36 may move in any direction. In this manner, the orientation of the ink head 36 can be suitably adjusted. Upon completion of adjustments in orientation, screws 21 and 22 are tightened to have the head holder 23 pressed against the head support 20, thereby determining the ink droplet ejecting direction of the ink head 36.

In the above-described embodiment, use is made of the packing 34 for supporting the base end of the ink head 36 as a pivotal point. However, use may be made of any other elements than packing for supporting the base end of the ink head 36 as a pivotal point. For example, use may also be made of an O-ring or any other flexible member so as to support the base end of the ink head 36 as a pivotal point. As an alternative structure, it may also be so structured that the forward end of the ink head 36 is supported as a pivotal point with the base end of the ink head 36 being freely movable and adjustable in orientation.

Figure 10:
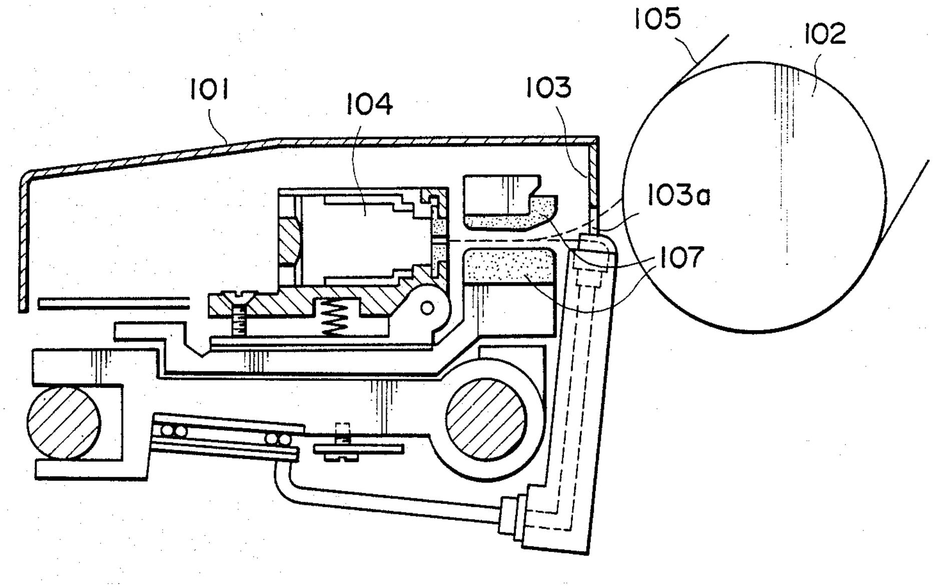
FIG. 10 PRIOR ART
FIG. 10 is a schematic illustration showing the structure of another prior art ink-jet printer.

Now, another aspect of the present invention will be described. In an ink-jet printer, it is well known that ink mist is produced during operation and such ink mist, when deposited on any parts of the ink-jet printer, can be a source of collecting various debris, such as paper powder. In a prior art ink-jet printer shown in FIG. 10, typically, a provision is made of an ink mist absorbing member 103 at the front end of a carriage cover 101 located opposite to a platen roller 102. The ink mist absorbing member 103 is formed with a slit 103*a* through which a series of ink droplets ejected from an ink head 104 pass before reaching a sheet of recording paper 105 placed around the platen roller 102. In such a prior art ink-jet printer, it is necessary to replace the ink mist absorbing member 103 with a new one periodically. Besides, in the prior art structure shown in FIG. 10, since the ink droplets landed on the sheet of paper 105 are charged to some extent, there is a case in which some or a part of the ink droplets are electrically attracted toward the deflection electrodes 107 through the slit 103*a* from the sheet of paper 105 after landing thereon.

This aspect of the present invention is directed to obviate the disadvantages associated with ink mist as described above. In accordance with this aspect of the present invention, an ink-jet head assembly 117 having a modular type structure is detachably mounted on a carriage 114, and the head assembly 117 is covered by a detachable carriage cover 118. A series of charged ink droplets ejected out of an ink head 119 inside of the head assembly 117 pass through a pair of top and bottom deflection electrodes 121, 121, whereby the series of charged ink droplets is selectively deflected by an electric field formed between the top and bottom electrodes 121, 121. The thus deflected ink droplets are allowed to land on a sheet of paper 111 for recording of a desired image thereon. The carriage cover 118 is provided with an outer ink mist absorbing member 123 preferably comprised of a resin material at the front end thereof, and, furthermore, an inner ink mist absorbing member 124 preferably comprised of a metal is provided at the front end of a top cover 117*b* of the ink head assembly 117. The outer and inner ink mist absorbing members 123 and 124 are formed with ink-passing slits 123*a* and 124*a*, respectively.

With this arrangement, the outer ink mist absorbing member 123 provided at the front end of the carriage cover 118 serves to effectively absorb ink mist, and, thus, this outer ink mist absorbing member 123 should be replaced with a new one periodically. Thus, the outer ink mist absorbing member 123 is preferably comprised of a resin material. On the other hand, the inner ink mist absorbing member 124 should be electrically conductive because it is expected to serve not only as an absorber for ink mist, but also as an electric field shield for shielding the electric field formed between the top and bottom deflection electrodes 121, 121, thereby preventing ink droplets to be returned toward the electrodes 121, 121 after landing on the sheet of paper 111.

Figure 6:
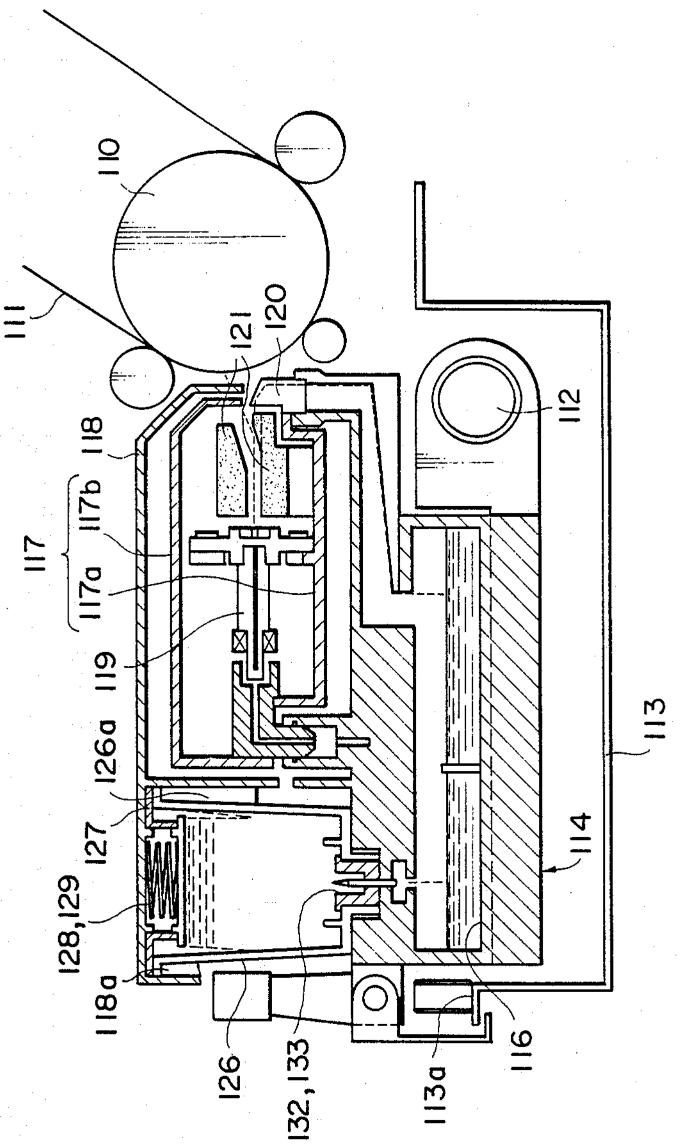
FIG. 6 is a schematic illustration showing an ink-jet printer constructed in accordance with another embodiment of the present invention.

Now, with reference to FIG. 6, one embodiment of an ink-jet printer constructed in accordance with one embodiment of this aspect of the present invention will be described in detail. As shown in FIG. 6, a platen 110 is rotatably supported between a pair of side plates (not shown) of a housing (not shown) of the present ink-jet printer and drive to rotate in a predetermined direction intermittently in a paper feed direction. A sheet of recording paper 111 is placed around the platen roller 110 so that the sheet of paper 111 is fed incrementally in the paper feed direction as the platen roller 110 is driven to rotate in the paper feed direction. A support shaft 112 and a support stay 113 also extend between the pair of side plates of the housing in parallel. The end portion of the support stay 113 is defined as a support portion 113*a*. A carriage 114 is provided to be reciprocatingly movable along and in parallel with the platen roller 110 as supported by the support shaft 112 and the support portion 113*a* of the stay 113.

The carriage 114 is provided with an ink tank 116 for containing therein a quantity of ink and also an ink supply pump (not shown) for supplying the ink contained in the ink tank 114 toward an ink head assembly 117 detachably mounted on the carriage 114. As shown in FIG. 6, a carriage cover 118 is also provided to cover all of the components on the carriage 114, including the ink head assembly 117, and the carriage cover 118 is detachably mounted on the carriage 114. The modular type ink head assembly 117 includes a generally bathtub-shaped bottom case 117*a* and a similarly bathtub-shaped top case 117*b* which is mounted on the bottom case 117*a* upside down. An ink head 119 is located inside of an enclosed space defined by the bottom and top cases 117*a* and 117*b* as adjustably mounted on the bottom case 117*a*. A piezo oscillator is provided in the ink head 119. A charging electrode is also provided at the front end of the ink head assembly 117, so that a series of ink droplets is ejected out of the ink head assembly 117 forwardly. In front of the ink head assembly 117 is disposed a pair of top and bottom deflection electrodes 121, 121 spaced apart from each other vertically to define an ink-flying gap therebteween and mounted on the bottom case 117*b*. Thus, the inside structure of the ink head assembly 117 may be substantially the same as that described previously.

Figure 7:
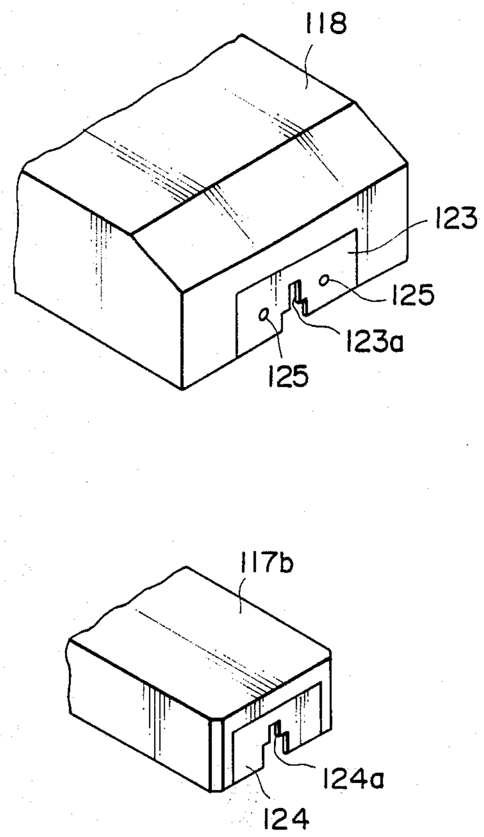
FIG. 7 is a fragmentary, perspective, exploded view showing a part of the ink-jet printer of FIG. 6.

Preferably, the carriage cover 118 and the top case 117*b* are formed from a plastic material, such as ABS resin. As shown in FIG. 7, an inner ink mist absorbing member 124 formed with an ink droplet passing slit 124*a* is provided at the front end of the top case 117*b*. Similarly, the carriage cover 118 is provided at its front end with an outer ink mist absorbing member 123 formed with an ink droplet passing slit 123*a*. When set in position, the slits 123 and 124 are aligned with the projecting direction of ink droplets ejected from the ink head 119. In the illustrated embodiment, the outer ink mist absorbing member 123 is fixedly attached to the front end of the carriage cover 118 as set in position by means of pins 125, 125. In this case, since the carriage cover 118 is preferably comprised of a plastic material, the pins 125, 125 are also made of a plastic material because they are integrally formed. Thus, after placing the outer ink mist absorbing member 123 with corresponding holes in position, the top ends of the pins 125, 125 may be thermally deformed to thereby have the outer ink mist absorbing member 123 fixedly attached to the carriage cover 118. In one embodiment, the outer ink mist absorbing member 123 may be preferably formed from a porous plastic material, such as a polyvinyl alcohol resin material. Such an ink mist absorbing material comprised of a porous material is advantageous because it is effective in absorbing ink mist produced, for example, when ink droplets impinge on the sheet of paper 111 or on the gutter 120. As such an ink mist absorbing member reduces its absorbing efficiency as it approaches a saturation level, it must be replaced with a new one after use for a while. In the present case, since the outer ink mist absorbing member 123 is fixedly attached to the carriage cover 118, the entire carriage cover 118 is replaced with a new one. Accordingly, it is also important to select a relatively inexpensive material for the carriage cover 118 and also for the ink mist absorbing member 123 because they are disposable.

On the other hand, the inner ink mist absorbing member 124 fixedly attached to the front end of the top cover 117*b*, which defines a part of the ink head assembly 117, is preferably comprised of an electrically conductive material, such as a metal. In one embodiment, the inner ink mist absorbing member 124 is formed from a porous metal material, such as a sintered stainless alloy. Thus, the inner ink mist absorbing member 124 has a dual function of absorbing ink mist and of shielding the electric field formed between the top and bottom deflection electrodes 121, 121, thereby preventing ink from returning to either one of the electrodes 121, 121 once having passed through the slit 124*a*.

Figure 8:
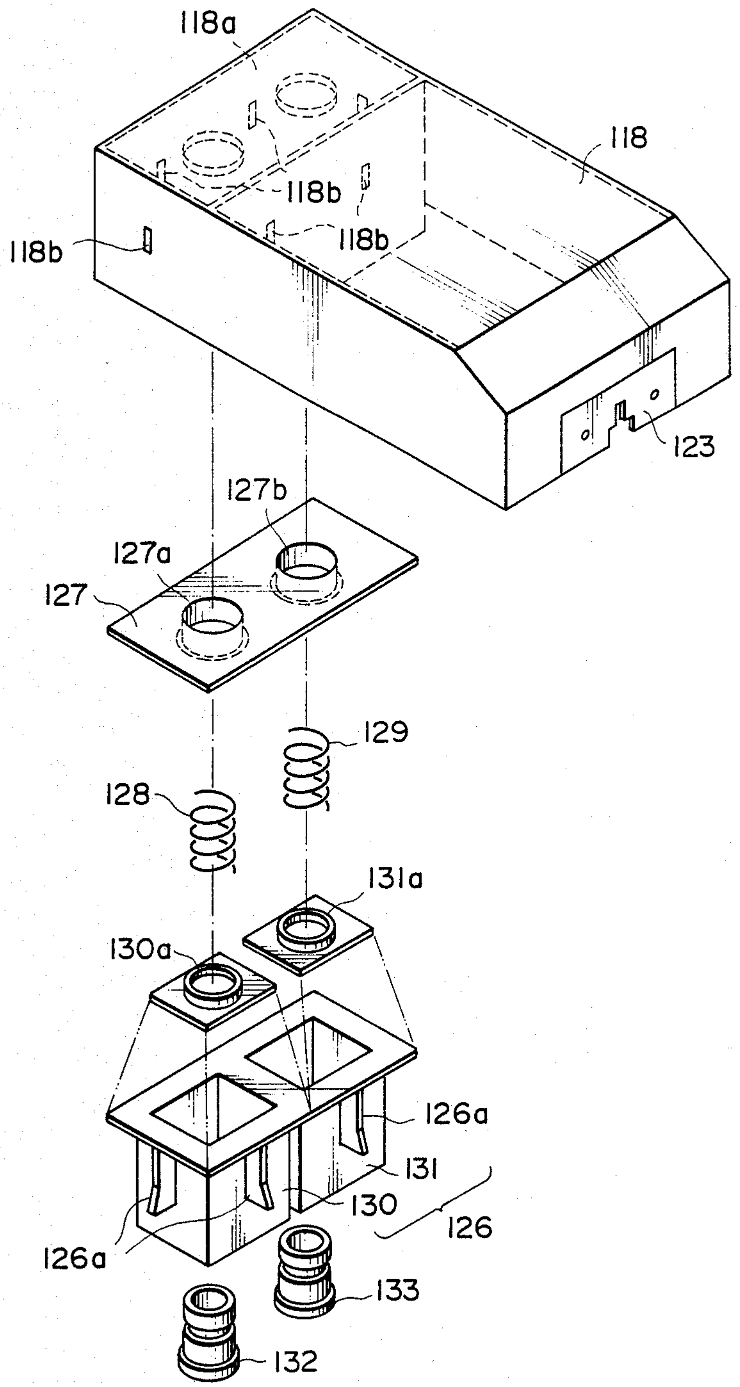
FIG. 8 is a perspective, exploded view showing another part of the ink-jet printer of FIG. 6.

FIG. 8 shows a structure for mounting an ink cartridge 126 in the present ink-jet printer shown in FIG. 6. As shown in FIG. 8, at the rear portion of the carriage cover 118 is defined an ink cartridge receiving chamber 118*a*. The four side walls defining the ink cartridge receiving chamber 118*a* are formed with slots 118*b*. In assembling, a holder plate 127 provided with a pair of downwardly extending cylindrical portions 127*a*, 127*b* arranged side-by-side is first inserted into the chamber 118*a*. And, then, a pair of compression springs 128, 129 is inserted into the chamber 118*a* such that the top end portion of each of the springs 128, 129 is fitted into the corresponding one of the cylindrical portions 127*a* and 127*b* of the holder plate 127. And, then, an ink cartridge 126 having an ink storing container 130 and a dilution liquid container 131 is inserted into the chamber 118*a*, whereby each of a pair of cylindrical projections 130*a* and 131*a* formed at top of the containers 130 and 131, respectively, is fitted into the bottom end portion of the corresponding one of the pair of springs 128 and 129. The ink cartridge 126 is provided with a plurality of side projections 126*a* at its four side walls corresponding in position with the slots 118*b* of the chamber 118*a*, so that these side projections 126*a* come to be fitted into the respective slots 118*b* when the ink cartridge 126 is pushed into the chamber 118*a*, whereby the ink cartridge 126 is set in position. Finally, a pair of rubber bushes 132 and 133 is fitted into the bottom of the containers 120 and 131.

In this manner, in the present embodiment, the carriage cover 118 is integrally provided with not only the outer ink mist absorbing member 123, but also the ink cartridge 126. Thus, when the carriage cover 118 is detached from the carriage 114, the outer ink mist absorbing member 123 and also the ink cartridge 126 are also detached from the carriage 114. As a result, when the ink and/or the dilution liquid has been consumed, the carriage cover 118 as a whole must be replaced with a new one, so that the outer ink mist absorbing member 123 is also replaced at this time.

Figure 9:
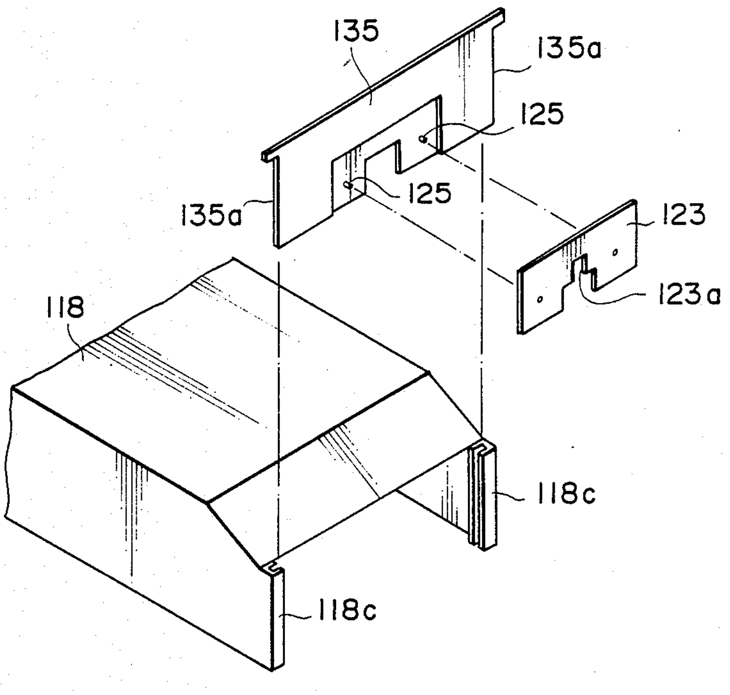
FIG. 9 is a fragmentary, perspective view showing a modified structure for mounting an ink mist absorbing member in accordance with a further embodiment of the present invention.

FIG. 9 shows an alternative embodiment of this aspect of the present invention. This embodiment is structurally similar to the previous embodiment shown in FIG. 8 excepting the fact that the outer ink mist absorbing member 123 is detachably mounted on the carriage cover 118. In the structure shown in FIG. 9, a pair of side rails 118*c*, 118*c* is formed at the right and left sides of the front end of the carriage cover 118. A removable front end wall 135 may be slidably fitted into the pair of side rails 118*c*, 118*c* at its both sides. The outer ink mist absorbing member 123 formed with the slit 123*a* is fixedly attached to the removable front end wall 135. In this case, similarly with the previous embodiment, when the removable front end wall 135 is formed from a plastic material, a pair of pins 125, 125 formed at the front surface of the front end wall 135 may be fitted into corresponding holes formed in the outer ink mist absorbing member 123 and deformed at their top ends to have the member 123 fixedly attached to the front end wall 135. With this structure, only the outer ink mist absorbing member 123 can be replaced with a new one while keeping the ink cartridge 126 in tack.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. An ink-jet head assembly for use in an ink-jet printer, comprising:

a generally bathtub-shaped bottom case;

ejecting means mounted on said bottom case for ejecting a series of charged ink droplets in a predetermined direction;

deflecting means mounted on said bottom case in front of said ejecting means for deflecting said series of charged ink droplets selectively in accordance with image information to be recorded; and collecting means mounted on said bottom case for collecting said series of charged ink droplets which have not been deflected beyond a predetermined level.

2. The assembly of claim 1 further comprising detecting means for detecting the presence of ink within a space defined by said bottom case.

3. The assembly of claim 2 wherein said detecting means includes an ink leakage detecting device.

4. The assembly of claim 1 wherein said collecting means includes a gutter which is integrally formed with said bottom case at a front end thereof.

5. The assembly of claim 1 further comprising a top case which is generally bathtub-shaped and mounted on said bottom case upside down.

6. The assembly of claim 1 wherein said ejecting means includes an ink head extending over a length and an ink passage formed therein, means for applying a driving force to said ink head to cause ink in the ink passage of said ink head to be ejected in the form of ink droplets, charging means for charging the ink droplets ejected from the ink head, and supporting means for supporting said ink head adjustably in orientation.

7. The assembly of claim 6 wherein said supporting means supports one end of said ink head as a pivotal point so that an opposite end of said ink head may be pivotally oriented in a desired direction around said pivotal point.

8. The assembly of claim 7 wherein said supporting means includes fixing means for fixing an orientation of said ink head after adjustment by said adjusting means.

9. An ink-jet printer comprising:

guiding means for guiding a sheet of paper along a first predetermined path;

a carriage;

moving means for moving said carriage along a second predetermined path in a reciprocating manner;

a print head assembly detachably mounted on said carriage, said print head assembly including ejecting means for ejecting a series of charged ink droplets forwardly, deflecting means for deflecting said series of charged ink droplets selectively in accordance with image information to be recorded, collecting means for collecting those charged ink droplets which have not been deflected beyond a predetermined level, and a housing for housing therein said ejecting means and deflecting means, said housing being provided with a first ink mist absorbing member formed with a first slit, through which said sufficiently deflected ink droplets may pass, and formed from an electrically conductive material; and a carriage cover detachably mounted on said carriage, said carriage cover covering said print head assembly when detachably mounted on said carriage in position, said carriage cover being provided with a second ink mist absorbing member formed with a second slit, through which said ink droplets passing through said first slit may pass, and formed from a selected material.

10. The printer of claim 9 wherein said electrically conductive material is a metal.

11. The printer of claim 10 wherein said metal is porous.

12. The printer of claim 9 wherein said selected material is a resin.

13. The printer of claim 12 wherein said resin is porous.

14. The printer of claim 9 wherein said second ink mist absorbing member is fixedly attached to said carriage cover at a front end thereof.

15. The printer of claim 14 wherein said second ink mist absorbing member is detachably mounted on said carriage cover at a front end thereof.

16. The printer of claim 9 wherein said carriage cover is also provided with an ink cartridge integrally.

* * * * *